Oct. 8, 1963 W. G. LYNSKEY 3,106,322
FERTILIZER DISPENSER
Filed March 10, 1961

INVENTOR.
William Gaston Lynskey.
BY

3,106,322
FERTILIZER DISPENSER
William Gaston Lynskey, 815 Fulton Ave.,
Falls Church, Va.
Filed Mar. 10, 1961, Ser. No. 94,905
2 Claims. (Cl. 222—473)

This invention relates to dispensers of the type particularly adapted for dispensing fertilizer for trees.

The usual method of fertilizing trees is to provide a plurality of holes on a circumference radially spaced from the tree and to fill the holes with powdered fertilizing material to a level just below the surface of the ground. It is important that the fertilizer not overflow the holes in order to prevent damage to the surrounding grass or plants by direct contact.

It is accordingly an object of this invention to automatically dispense the required amount of fertilizer in a hole to the proper level below the ground surface.

It is a further object of this invention to dispense the required amount of fertilizer in a hole without the necessity of measuring the amount of fertilizer prior to the dispensing operation.

Figure 1:
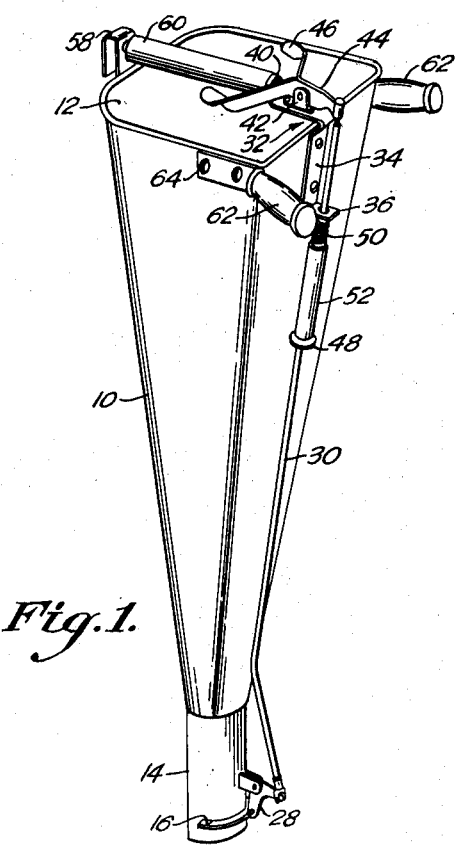
Figure 2:
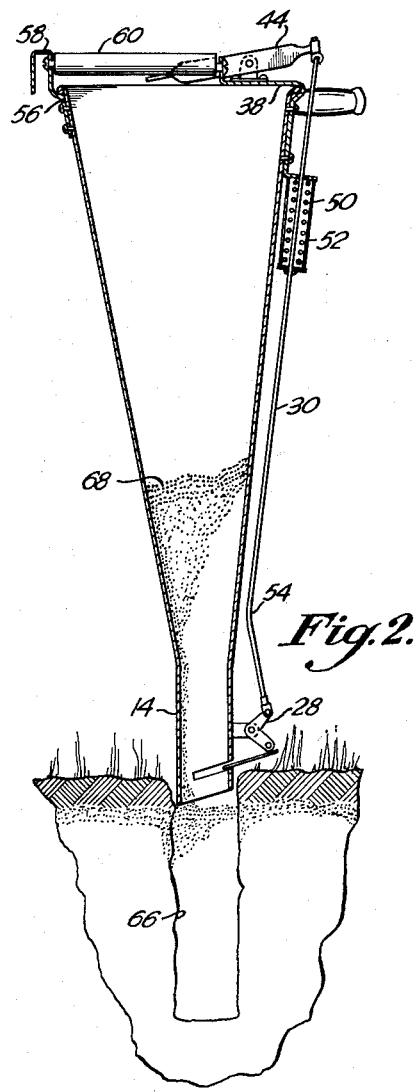
Figure 3:
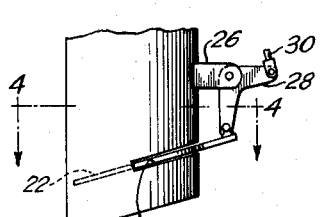
Figure 4:
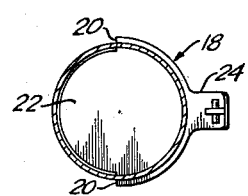

These and further objects will become apparent from the following description taken in connection with the accompanying drawing wherein:

FIG. 1 is a perspective view of the dispenser;
FIG. 2 is a sectional view of the device shown in FIG. 1;
FIG. 3 is an enlarged detail view of the dispensing tube; and
FIG. 4 is a sectional view taken on line 4—4 of FIG. 3.

Referring to the drawings, the dispenser comprises a substantially conically-shaped container or hopper 10 having an enlarged open end 12. Formed on the opposite small end of hopper 10 is an elongated dispensing tube 14 which communicates with the interior of the hopper 10.

Formed in tube 14 intermediate its ends is a slot 16. Slot 16 preferably forms an acute angle with the vertical axis of tube 14. Slidably mounted in slot 16 is a flat, circular valve member 18. Valve member 18 is cut away along its periphery to define a pair of shoulders 20 which cooperate with the ends of slot 16 to form a stop means. The cut-away portion 22 of valve member 18 has a diameter which is approximately the same as the inside diameter of tube 14 so that, when the valve is in the closed position as illustrated in FIGS. 3 and 4, the flow of material through tube 14 is prevented. A projecting tab member 24 is formed on the outer periphery of valve member 18 opposite portion 22 for connection with the valve actuating mechanism.

Mounted on the outer wall of tube 14 is a bracket 26. Bracket 26 is connected to tube 14 by any conventional means, such as welding. Pivotally connected to bracket 26 is a bell crank lever 28. Bell crank lever 28 has one end pivotally connected to tab 24 of valve 18 and the other end pivotally connected to a lever 30.

Mounted on the upper portion of the outer wall of hopper 10 adjacent the open end 12 is a bracket 32. Bracket 32 has a downwardly projecting leg 34 which is secured to hopper 10 by conventional screws. An apertured tab 36 laterally projects from the end of leg 34. Bracket 32 is provided with a laterally projecting leg 38 which extends across the open end of hopper 10. An apertured tab 40 projects vertically from the end of leg 38. A lug 42 is mounted on leg 38 and an actuator 44 is pivotally mounted on lug 42. Actuator 44 is Y-shaped to provide a pair of actuator tabs 46.

Formed on lever 30 is a circular shoulder 48. A compression spring 50 has one end seated on shoulder 48 and the other end seated against tab 36 of bracket 32. Spring 50 serves to bias lever 30 downwardly, thereby urging valve 18 to the closed position. A stop sleeve 52 is concentrically mounted on shoulder 48 and has a length less than the extended length of spring 50. Thus, when actuator tabs 46 are depressed to move valve 18 to the open position, sleeve 52 acts as a limit stop against tab 36 as shown in FIG. 2. Lever 30 is preferably bent inwardly at 54 to conform to the contour of hopper 10.

A support bracket 56 is mounted on the upper wall of hopper 10 opposite bracket 32 by means of conventional screws. Support bracket 56 has an inverted U-shaped portion 58 which may be utilized to store the dispenser when not in use or when filling the hopper with material. A handle 60 extends across open end 12 and has one end mounted on support bracket 56 and the other end mounted on tab 40 of leg 38 of bracket 32.

A pair of auxiliary handles 62 are mounted on the upper sidewalls of hopper 10 by means of screws 64. Auxiliary handles 62 are particularly useful when it is desired to use the dispenser under bushes or low overhanging branches in a manner to be described below.

In operation, a plurality of holes 66 are provided in a ring around the tree to be fertilized. Holes 66 are generally 1½ or 2 inches in diameter and have a depth of 15 to 18 inches. Hopper 10 is filled with fertilizing material 68. The operator then grasps the handle 60 and places the end of dispensing tube 14 in hole 66. It should be noted that tube 14 projects several inches below the surface of the ground. This is an important feature inasmuch as any fertilizer that overflows the hole 66 onto the surrounding ground surface would seriously damage any grass or plants that it came in direct contact with. The operator then depresses one of the actuator tabs 46, depending upon which hand was used to grasp handle 60. Depression of tabs 46 causes actuator 44 to pivot in a counterclockwise manner about its pivot which in turn moves lever 30 upwardly until the top of sleeve 52 abuts portion 36 of bracket 12. This upward movement of lever 30 causes bell crank 28 to pivot about bracket 26 and move valve 18 to the open position shown in FIG. 2. The fertilizing material then flows through tube 14 into hole 66 until the hole is filled to the bottom of tube 14. When this level is reached, the forces acting on the fertilizing material are equalized and the flow stops.

When the flow stops, the operator merely releases actuator tabs 46 whereupon spring 50 urges valve 18 back to the closed position preventing further flow through tube 14. The operator then moves the device to the next hole and repeats the above sequence of operation.

In the event it is desired to fill a hole underneath the overhanging branches of a bush or tree, the operator may utilize auxiliary handles 62, using one hand to steady the dispenser and the other to actuate tabs 46.

Thus, it is seen that the present invention provides a simple, inexpensive device for fertilizing trees, eliminating the need for funnels, cups, etc., and one that automatically dispenses the required amount of material into a hole without the danger of overflowing or the necessity of pre-measuring the amount of material needed for each hole.

While a specific construction has been described, it will readily be apparent that various modifications and alterations can be made in the device without departing from the scope of the invention as defined in the appended claims.

I claim:
1. Apparatus particularly adapted for fertilizing trees by filling a plurality of holes in the ground surrounding the tree with powdered fertilizer to a level just below the ground surface comprising;
a hopper having a relatively large, open, inlet end and a relatively small outlet end,
said inlet and outlet ends being joined together by tapered side walls,
an elongate, cylindrical dispensing tube having its upper end secured to the outlet end of the hopper,
a slot formed in the dispensing tube near the lower end thereof,
said slot being slightly upwardly inclined relative to a plane normal to the longitudinal axis of the dispensing tube,
valve means slidably mounted in said slot and movable between open and closed positions for controlling the flow of material from said hopper through said dispensing tube,
bracket means mounted on the hopper side wall adjacent the inlet end,
lever means slidably mounted in said bracket means,
a shoulder formed on said lever means,
a bell crank pivotally mounted on said dispensing tube intermediate said slot and the upper end of said dispensing tube,
said bell crank having one end pivotally connected to said lever means and the other end pivotally connected to said valve means,
a spring mounted between said shoulder and said bracket means surrounding said lever means biasing said valve means toward its closed position preventing flow of material from the hopper through the dispensing tube,
a laterally projecting leg formed on said bracket means extending across said inlet end,
a handle overlying the inlet end having one end connected with the laterally projecting leg,
and an actuating lever pivotally mounted intermediate its ends on said laterally projecting leg,
one end of said lever being pivotally connected to said lever means for actuating the valve means to the open position against the bias of said spring whereby when the lower end of the dispensing tube is inserted into a hole in the ground material will be dispensed from said hopper up to the level of said valve.

2. The construction defined in claim 1 further including a pair of actuating tabs formed on said actuating lever and disposed on opposite sides of said handle for selectively actuating said actuating lever,
a pair of auxiliary handles projecting outwardly from the hopper side walls on opposite sides of said lever,
and a support bracket connected with the opposite end of said handle on said laterally extending leg.

References Cited in the file of this patent

UNITED STATES PATENTS

| | | |
|---|---|---|
| 330,766 | Abbott | Nov. 17, 1885 |
| 467,074 | Anderson et al. | Jan. 12, 1892 |
| 468,346 | Johnson | Feb. 9, 1892 |
| 558,715 | Bradley | Apr. 21, 1896 |
| 905,102 | Richards | Nov. 24, 1908 |
| 1,506,919 | Corkran et al. | Sept. 2, 1924 |
| 2,151,604 | Kushima | Mar. 21, 1939 |
| 2,245,803 | McWhirter | June 17, 1941 |